Patented Nov. 9, 1937

2,098,789

UNITED STATES PATENT OFFICE 2,098,789

LEATHER SUBSTITUTE

Russell Morgan, Drexel Hill, Pa., assignor to E. I. du Pont de Nemours & Company, Wilmington, Del., a corporation of Delaware No Drawing. Application October 31, 1935, Serial No. 47,616

5 Claims. (Cl. 91—68)

This invention relates to a material which is coated with a composition containing rubber and especially to a material which resembles light weight leather, such as that which is extensively used in shoes for insoles, quarter-linings and the like.

Heretofore a rubber coated material has been made by first impregnating and then coating a heavily and thoroughly napped fabric with a cement containing a rubber composition. Any napping of a fabric and especially the thorough napping of the fabric which is necessary to give the impregnated material the desired leather-like properties weakens the fabric more or less in accordance with the degree of napping. As the most satisfactory appearance and quality are produced by coating the more thoroughly and extensively napped materials, the tensile strength of the material decreases to an undesirable degree as the desirable leather-like qualities are approached. Because of the weakening which results from the napping of the fabric, it is necessary in making the prior art material to use an especially strong and heavy woven base material in order to obtain the necessary napping and the necessary strength in the finished product. The heavy fabrics which are necessary for this purpose are composed of special materials or have to be made by special processes, as a consequence of which they are costly. Since the selection of materials must be made from those which are capable of being napped, only a few kinds of materials which would otherwise be suitable can be used. These restrictions contribute to the cost of the leather substitute heretofore made. Therefore, it is desirable to provide means to make a less costly rubber coated leather substitute which has the desirable properties and can be used for the purposes indicated.

It is an object of the invention to provide a rubber coated material resembling leather which comprises a relatively inexpensive sheeted base material.

Another object of the invention is to provide improvements in the manufacture of the described leather substitute whereby napped material may be dispensed with and woven or unwoven fabrics can be used as the base material.

These objects may be accomplished according to the present invention by impregnating a suitable pliable woven or non-woven fabric base material with a rubber compound and superimposing on the impregnated base a plurality of coats of a rubber compound composition which contains flock material suitably distributed in the compound. The thus coated material is then passed through rollers to provide a continuously non-waving or smooth surface and the material is finally top coated with a rubber compound composition free from fibers. The final coating is treated with a dusting, drying or finishing agent to provide a dry or non-adherent surface and the structure is finally subjected to vulcanization.

The following example of an embodiment of the invention is given by way of illustration but not by way of limitation.

A square weave cotton fabric 38 inches wide, weighing approximately 5⅓ ounces per linear yard is impregnated by any of the usual procedures well known in the art of treating fabrics, with one application of a rubber composition dispersed in a suitable dispersing medium such as gasoline, naphtha or the like. The rubber compound has the following formula:

| | Parts by weight |
|---|---|
| Rubber | 40 |
| Factice (white) | 10 |
| Barytes | 15 |
| Lithopone | 30 |
| Magnesium carbonate | 10 |
| Pigment | 1 |

This composition is prepared according to any of the procedures well known to those skilled in the art of rubber compounding. The compound is dispersed in gasoline to produce a cement having the proper consistency or viscosity for impregnating purposes. A satisfactory ratio of rubber compound to dispersing agent is 1 to 1, although more or less of the dispersing agent may be used, dependent largely upon the desired viscosity of the so-called cement. After the impregnation of the fabric the volatile solvent is removed and the material is dried by any convenient means such as passing over heated coils or through a suitably heated drying chamber.

I then apply to one face of the impregnated fabric a plurality of coats of a cement composition which comprises about one part by weight of cotton flock to about three parts by weight of the above described cement composition and some dispersing medium. This composition is desirably prepared by adding the flock and the dry rubber compound simultaneously to the gasoline or other dispersing medium. The ingredients are stirred until the rubber composition is homogeneously dispersed in the dispersing medium and the fibers are submerged therein. The fibers are generally separated from each other, at least sufficiently so that the composition can be applied with a dull or rounded doctor knife but the working of the compound is not carried to the extent that the fibers are materially broken down or masticated or the principal natural characteristics or identity of the fibers are destroyed. A relatively poor dispersion of the fibers can be used. The objective in preparing this composition is to avoid short fibers and high density products but to surround the fibrous material with rubber cement and produce a relatively low density product. The fibers are not masticated, broken down or shortened materially. This helps to give bulk, compressibility, flexibility and the desired degree of elasticity to the finished coating. Other details of preparing such compositions are well known to those skilled in the art.

The impregnated and coated material is then given a uniform surface, and if desired, it may be given a reduced thickness by compression. Although these operations may be performed separately, it is convenient and desirable to do both at once. Accordingly the material is passed through suitable rollers, such as calender rolls to smooth the material and to bring it to the desired thickness. After the calendering treatment or other treatment to give the surface a uniform finish or thickness as the case may be, a thin film of the above described rubber composition is disposed on the surface by applying one or more coats of the above described flock-free cement and removing the volatile material. The latter coat is particularly useful to give smoothness when relatively poor dispersions of fibers in cement are used or where for other reasons the coating is unduly porous, rough, or lacks the firmness, pleasing appearance, feel and wear resistant properties which are possessed by coatings of this material. The coated material is then dusted on both sides with a dusting agent, such as potato starch and finally subjected to vulcanization by the well known sulfur chloride acid process. Any excess of sulphur chloride which may be retained in the material is neutralized with ammonia fumes. The material is then ready for use.

A satisfactory leather substitute for some purposes may be made in accordance with the invention by omitting the impregnation of the fabric base with rubber cement. In accordance with this modification, a plurality of coats of the rubber cement are applied to the fabric and the flock containing composition is applied and thereafter the article is completed as has been described.

The final coating of rubber which is free from flock may consist of a plurality of layers but this final coating may be dispensed with. If desired a surface ornamentation or finish may be formed either in the flock-containing or in the non-flock-containing rubber composition.

Various types of rubber composition may be used in the coating and any suitable method of vulcanization can be employed. For example, the following composition may be used instead of the composition described in the foregoing example and dry heat vulcanization may conveniently be employed therewith, but still other methods of vulcanization and rubber compositions may be used.

|  | Parts by weight |
|---|---|
| Rubber | 25 |
| Zinc oxide | 3 |
| Petrolatum | 2 |
| Whiting | 67 |
| Pigment | 2 |
| Accelerator | ¾ |
| Sulfur | ½ |

The content of flock or other fibrous material in the coating composition may be varied within broad limits. From about 1 to about 6 parts by weight of the fibrous material to 12 parts by weight of the rubber composition exclusive of dispersing agent gives good results depending upon the properties, such as the bulkiness, non-clothy appearance, flexibility, the degree of elasticity and the strength desired in the flock-containing layer.

The products made in accordance with the present invention are especially useful because of their leather-like properties, high tensile strength and high resistance to tearing for use as quarter lining and insoles for shoes, lining for pocketbooks, belts, luggage and the like. A large variety of fabrics may be prepared in accordance with the present invention by varying the basic material which is to be coated. For example, fabrics made of a large variety of woven or unwoven fibers can be used, such as cotton, wool, rayon, silk, flax, jute, wood fibers, and the like. Such fibers are among a large variety of fibers which can be used similarly to and instead of cotton in making the fiber-containing coating composition. For example, wood flour gives excellent results when it is incorporated into the rubber compound so as to give the described low density composition.

The composition containing rubber compound and fibrous material can be made by first working the fibre and rubber together on the mill at the end of the mill mixing operation and thereafter dispersing the composition in dispersing medium. In making the initial mixture on the mill, care must be taken not to work the mixture too drastically or too long. The composition is preferably not worked further than the minimum which is necessary to work the fibers and composition together. The mixture is worked so that a submersion of the fibers is accomplished without destroying the natural physical character of the fibers and the working is not extended so long or so drastically that a high density mixture will be produced.

Still other variations and modifications of the invention can be made and it is to be understood that the invention is not limited to the modifications which have been mentioned. No limitations except such as are imposed by the prior art or specified in the claims are intended.

I claim:

1. The process which comprises impregnating a square weave unnapped cotton fabric weighing 5⅓ ounces per linear yard of 38 inch width with a gasoline dispersion of

|  | Parts by weight |
|---|---|
| Rubber | 40 |
| Factice (white) | 10 |
| Barytes | 15 |
| Lithopone | 30 |
| Magnesium carbonate | 10 |
| Pigment | 1 | removing the gasoline, coating one face of the impregnated fabric with a dispersion of one part of cotton flock and three parts of a composition consisting of

| | Parts by weight |
|---|---|
| Rubber | 40 |
| Factice (white) | 10 |
| Barytes | 15 |
| Lithopone | 30 |
| Magnesium carbonate | 10 |
| Pigment | 1 | calendering the coated impregnated fabric, coating the calendered, coated impregnated fabric with a cement consisting of dispersing agent and

| | Parts by weight |
|---|---|
| Rubber | 40 |
| Factice (white) | 10 |
| Barytes | 15 |
| Lithopone | 30 |
| Magnesium carbonate | 10 |
| Pigment | 1 | dusting the coated, calendered, coated, impregnated fabric to avoid a tacky surface and vulcanizing.

2. Artificial leather material obtainable by the process of claim 1.

3. The process which comprises impregnating a woven unnapped fabric with a rubber dispersion containing a filler and free from flock, removing the dispersing agent, coating the impregnated fabric with a rubber cement containing a filler and a flock, smoothing the surface, coating with a rubber dispersion containing a filler in an amount greater than the amount of rubber and vulcanizing thereby preventing napping of the flocked coating.

4. The process which comprises impregnating a woven unnapped fabric with a rubber dispersion containing a filler, factice, and free from flock, removing the dispersing agent, coating the impregnated fabric with a rubber cement containing a filler and a flock, smoothing the surface, coating with a rubber dispersion containing a filler in an amount greater than the amount of rubber whereby napping of the flock-containing coat is prevented and vulcanizing.

5. A leather-like material having a smooth non-napped surface which comprises a pliable unnapped sheeted fibrous base material impregnated with a flock-free rubber dispersion containing a filler and coated with a rubber composition containing a filler and fibers to give the coating wear-resistance, a bulkiness, a pliability and an elasticity similar to leather, said fibers being submerged in the rubber composition without materially altering the principal natural characteristics of the fiber, and the said coating in turn being coated with a non-fibrous rubber dispersion containing a filler in an amount greater than the amount of rubber whereby a non-napped surface is produced.

RUSSELL MORGAN.